United States Patent [19]

Muccillo, Jr.

[11] 4,010,811
[45] Mar. 8, 1977

[54] PLATFORM SCALE

[76] Inventor: Vincent Joseph Muccillo, Jr., 952 La Jolla Rancho Road, La Jolla, Calif. 92037

[22] Filed: Aug. 7, 1975

[21] Appl. No.: 602,771

[52] U.S. Cl. .......................... 177/257; 177/DIG. 9
[51] Int. Cl.² ..................................... G01G 21/08
[58] Field of Search ............. 177/256, 257, DIG. 9

[56] References Cited

UNITED STATES PATENTS

| | | | |
|---|---|---|---|
| 1,302,884 | 5/1919 | Varney | 177/DIG. 9 |
| 1,572,328 | 2/1926 | Taylor | 177/257 |
| 1,660,820 | 2/1928 | Shively | 177/DIG. 9 |
| 1,759,884 | 5/1930 | Bousfield | 177/DIG. 9 |
| 2,007,394 | 7/1935 | Gumprich | 177/257 |
| 3,369,621 | 2/1968 | Hutchinson et al. | 177/257 |

*Primary Examiner*—George H. Miller, Jr.
*Attorney, Agent, or Firm*—Brown & Martin

[57] ABSTRACT

A platform scale having an interconnected lever type suspension in which all of the suspension links are adjustable for optimum alignment of the mechanism. Each suspension member has an adjustable pin with a V-notch to receive a thin blade type hanger link, each pin having locking means by which the mechanism can be set with all the hanger links accurately vertical, so that no offset loads or drag are applied to the scale. The mechanism is applicable to electronic readout systems utilizing strain gauges or similar force indicating means, or to beam type scale mechanisms with adjustable weights.

11 Claims, 9 Drawing Figures

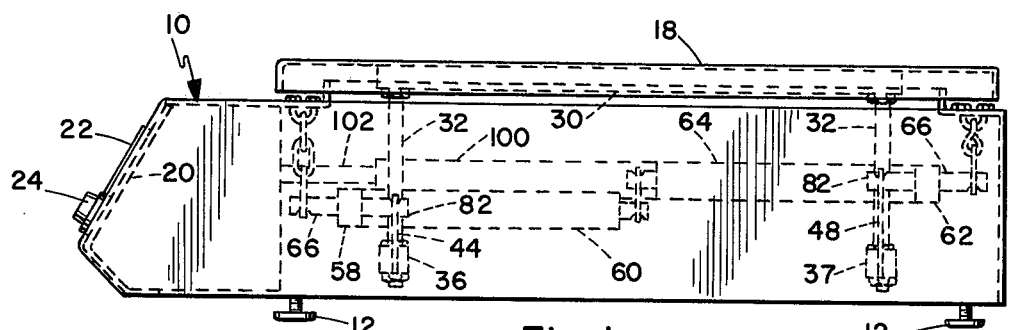

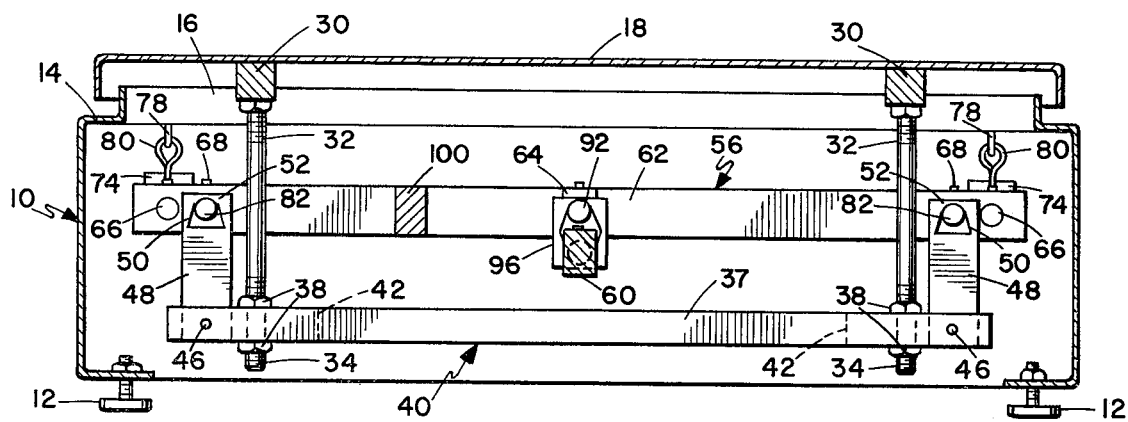
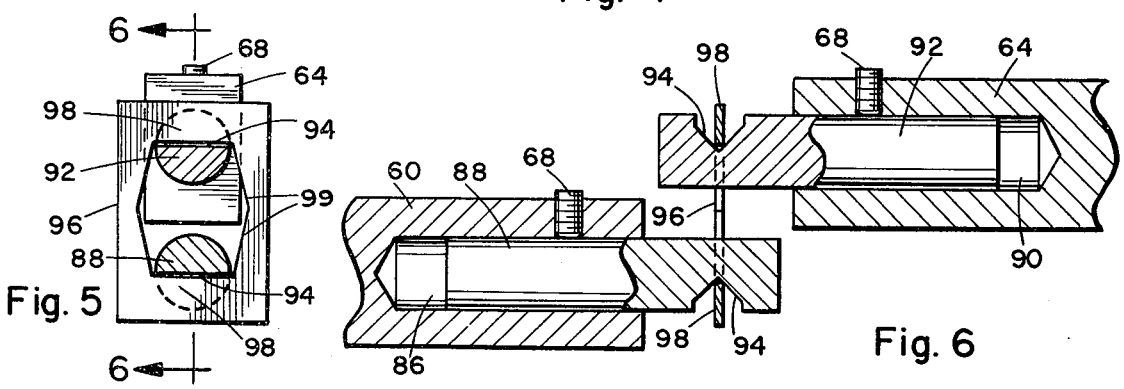
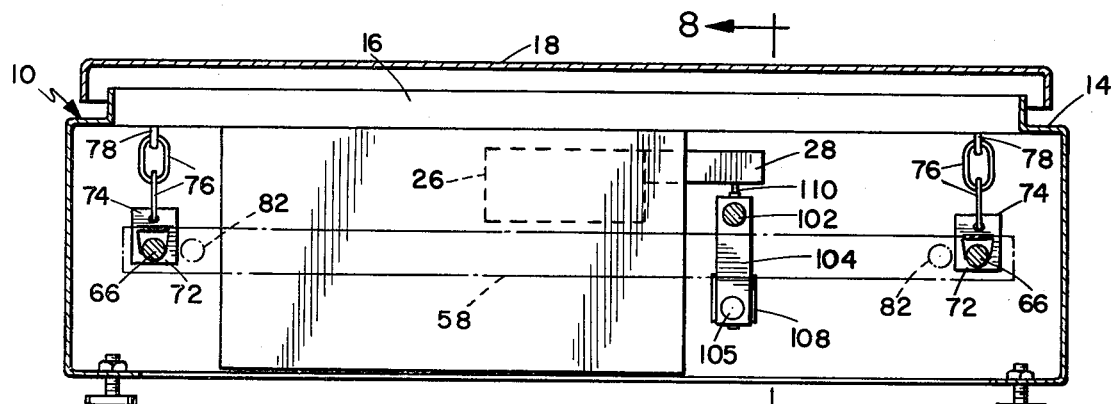
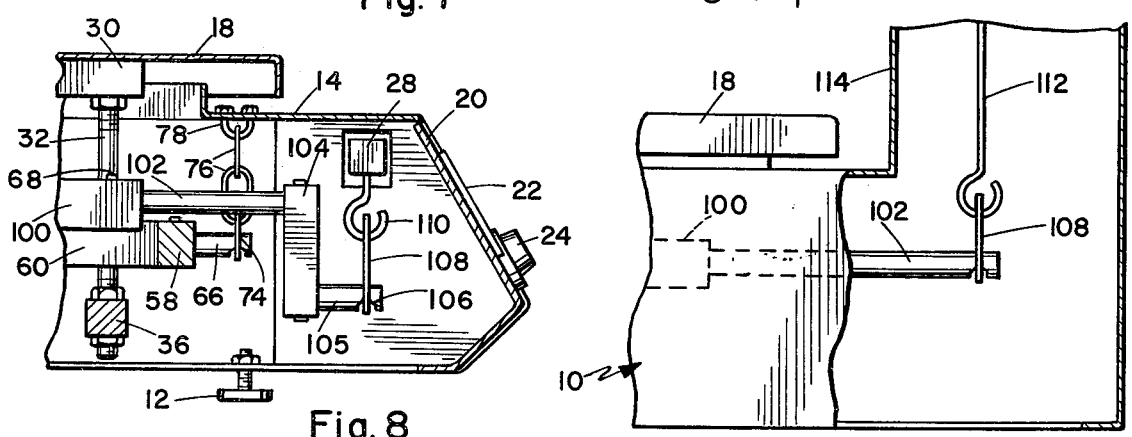

PLATFORM SCALE

BACKGROUND OF THE INVENTION

One basic type of platform scale has a weighing platform supported on a lever mechanism which converts a small deflection under load to a large scale useful readout. The lever mechanism comprises a pair of T-shaped levers, each of which is suspended from a supporting frame by the cross bar portion of the T. The stem portions of the levers overlap and are pivotally interconnected, one stem extending for connection to the readout means. Various pivotal suspension means have been used, such as hooks with loops or notched portions engaging pins or knife edged members.

This type of mechanism is suitable for mechanical readout means, using a rotating pointer or a beam with adjustable weights. However, with an electronic readout system, particularly the digital type, the mechanism is not sufficiently accurate to use the full potential of the readout. The basic problem is that the suspension means has little or no provision for adjustment. Certain of the pins, hooks, knife edges and other elements are fixed in the frame structure for convenience and simplicity of manufacture. Due to necessary manufacturing tolerances, some of the linkages may not hang truly vertical or in proper alignment. As a result, there may be undesirable offset loads and drag on the mechanism under varying load conditions which, due to the magnified readout, can cause a substantial discrepancy in the indicated weight.

SUMMARY OF THE INVENTION

The scale mechanism described herein utilizes a pair of interconnected T-shaped levers on which the weighing platform is supported. The levers, their interconnection and the platform attachment all have suspension linkages which are readily adjustable for optimum alignment of the mechanism. All adjustment means are accessible from the top of the scale and the only tool required is a screwdriver or a wrench, depending on the type of locking screws used. Each adjustment element is a simple pin slidably mounted in the associated lever or frame member, each pin having a V-notch to receive a thin blade type suspension link.

The basic components can be set up with reasonable accuracy before assembly and final alignment made by adjustment of only a few of the linkages, with the mechanism fully assembled. The structure is simple to manufacture and assemble and tolerances are not particularly critical, due to the wide range of available adjustment. An output arm, extending from one of the levers, also has an adjustable linkage for connection to readout mechanism, which can be electronic or mechanical. Due to the accuracy made possible by fine adjustment of the lever mechanism, the full capability of a precise digital readout can be utilized.

The primary object of this invention, therefore, is to provide a new and improved platform scale.

Another object of this invention is to provide a platform scale having a lever type mechanism which is fully adjustable for accurate alignment.

Another object of this invention is to provide a platform scale mechanism which is adaptable to electronic or mechanical readout means.

A further object of this invention is to provide a platform scale mechanism which is simple to manufacture and maintain and which is adaptable to a wide range of load conditions.

Other objects and advantages will be apparent in the following detailed description, taken in conjunction with the accompanying drawings, in which:

FIG. 1 is a side elevation view of one configuration of the platform scale.

FIG. 2 is a top plan view of the scale, with the platform removed to reveal the mechanism.

FIG. 3 is an enlarged sectional view taken on line 3—3 of FIG. 2.

FIG. 4 is a sectional view taken on line 4—4 of FIG. 3.

FIG. 5 is an enlarged sectional view taken on line 5—5 of FIG. 3.

FIG. 6 is a sectional view taken on line 6—6 of FIG. 5.

FIG. 7 is a sectional view taken on line 7—7 of FIG. 3.

FIG. 8 is a sectional view taken on line 8—8 of FIG. 7.

FIG. 9 is a side elevation view, partially cut away, showing the connection of the mechanism for a mechanical type readout.

DESCRIPTION OF THE PREFERRED EMBODIMENT

The scale as illustrated is contained in a box housing 10 of any suitable configuration, and is supported on adjustable feet 12 to facilitate leveling. The scale can also be mounted on wheels for portability, since leveling is not especially critical. The top panel 14 of housing 10 has a large flange opening 16, over which the weighing platform 18 is positioned. A front panel 20 mounted in the housing carries a readout dial 22 and a control knob 24 for adjusting a zero setting on the dial when the platform is unloaded. The arrangement is suitable for a digital electronic readout utilizing a strain guage 26, with an attachment arm 28. The circuitry and operation are well known and are not critical to the disclosure, since other types of readouts may also be used.

Platform 18 is mounted on a pair of spaced parallel support bars 30, which are carried on vertical posts 32 at their ends. The posts 32 have threaded lower ends 34 and are secured in a pair of spaced parallel hanger bars 36 and 37 with lock nuts 38 which provide for leveling of the platform above the housing. Support bars 30, posts 32 and hanger bars 36 and 37 together comprise a rigid suspension frame 40, by which the platform 18 is suspended from the lever mechanism. Both ends of both hanger bars 36 and 37 have longitudinally extending vertical slots 42. Secured in slots 42 of hanger bar 36 are upwardly extending link plates 44, each link plate being pivotally held by a pin 46 to swing in the longitudinal plane of the hanger bar. Secured in the slots 42 of hanger bar 37 are similar but longer link plates 48, also held by pins 46. Near the upper end of each of the link plates 44 and 48 is an opening 50, the upper end portion of the plate comprising a transverse blade 52 across the opening, the sides of the opening converging toward the blade.

The lever mechanism comprises a pair of T-shaped levers 54 and 56. Lever 54 has a cross bar 58 with a stem 60 fixed perpendicularly thereto, and lever 56 is similar with a cross bar 62 and a perpendicular stem 64. The levers are mounted in housing 10 with the stems 60 and 64 extending toward each other in parallel alignment, but with stem 64 slightly higher than stem 60. Adjacent the ends of cross bar 58 are support pins 66, projecting horizontally from the side opposite stem 60, the support pins being slidably adjustable through the cross bar and secured by lock screws 68. Each support pin 66 has a V-notch 70 in the underside to receive the blade 72 of a link plate 74. The link plate, in turn, is suspended from a pair of chain links 76, attached to a U-bolt 78 which is secured to top panel 14.

Lever 56 is suspended in a similar manner by support pins 66 projecting from the ends of cross bar 62, and link plates 74. Since lever 56 is higher than lever 54, single chain links 80 are used to attach the link plates to U-bolts 78 below the top panel 14.

Adjacent opposite ends of cross bar 58 are hanger pins 82, spaced inwardly from support pins 66 and projecting from the opposite side of the cross bar. Hanger pins 82 are also slidably adjustable in the cross bar and secured by lock screws 68. Each hanger pin 82 has a V-notch 84 to receive the blade 52 of a link plate 44, so that hanger bar 36 is suspended from lever 54. Cross bar 62 has similar hanger pins 82 adjustably mounted therein to support link plates 48 and hanger bar 37.

The inner end of stem 60 has a longitudinally extending socket 86, in which is an axially slidable connecting pin 88, secured by a lock screw 68. Stem 64 has a similar socket 90 holding a connecting pin 92, which is secured by a lock screw 68, as in FIG. 6. Connecting pins overlap in vertically spaced parallel relation, the upper portion of pin 88 and the underside of pin 92 having corresponding V-notches 94. The connecting pins are interconnected by a double ended coupling link plate 96, having blades 98 at both ends to seat in V-notches 94. The sides 99 of the opening between blades 98 converge toward the blades at both ends. This configuration is typical of all the link plates, single and double ended, and provides the stable but adjustable support required. Each blade has a wide support in the V-notch across the full diameter of the respective pin, which will enable heavy loads to be supported without distortion. Knife edges and other minimum contact area supports are limited in load carrying capability and do not retain their accuracy. The converging sides of the opening in each link plate prevent lateral creeping of the pin along the blade, and also minimizes the contact area between the sides and the pin surface to reduce friction. All of the adjustable pins are parallel and are moved axially to set the link plates vertical in the front to rear direction. Deviations from vertical in the side to side direction are not as critical and the pins can be rotated slightly as needed to seat the link plate blades squarely in their respective V-notches.

Fixed to cross bar 62 and projecting parallel to stem 64 is an output arm 100 extending almost to the cross bar 58. Axially slidably mounted in the end of output arm 100 is an output pin 102, secured by a lock screw 68 in the manner of the connecting pins in FIG. 6. Due to the difference in height between the levers, output pin 102 passes above cross bar 58. The clearance required is small since the actual deflection of the mechanism is very slight. The output pin is the means for connection to the readout mechanism and may be adapted to suit.

In the arrangement illustrated in FIGS. 7 and 8, a spacer block 104 is secured to output pin 102 the extends downwardly. In the lower end of the spacer block 104 is a coupling pin 105 having a V-notch 106 to receive a link plate 108. The link plate 108 is attached to a hook 110 on the strain gauge arm 28. The spacer block may be made adjustable on the output pin 102 and the coupling pin 105, although the adjustment of the output pin in output arm 100 will normally handle all adjustment necessary.

In an alternative arrangement shown in FIG. 9, the output pin 102 is extended and is coupled directly by a link plate 108 to a tie road 112. The tie rod 112 extends through a pillar 114, or other structure, to the readout mechanism, which can be electronic or a mechanical system, such as the conventional weighted beam.

In setting up the mechanism, all the V-notched pins can be adjusted as necessary, so that all link plates are handing truly vertical. This eliminates any offset or side loads on the mechanism and greatly increases the accuracy, since the actual movements are very small and any unnecessary drag causes deviation. All of the adjustable pins are locked in place by similar lock screws 68, all of which are accessible through the opening 16, as seen in FIG. 2. Alignment is thus a simple matter with a single tool. As illustrated, all of the adjustable pins are in the levers, but certain connections could be reversed to suit a specific scale configuration.

Load on platform 18 is transferred through the suspension frame 40 to the interconnected levers, and through the output arm to the readout mechanism. The basic mechanics of the lever system are well known, but the suspension structure shown has been found to improve the results greatly. In other lever type mechanisms, one or both elements of each link in the suspension may be fixed in the respective portion of the structure, making fine adjustment difficult, if not impossible. In addition, much of the usual structure is welded, resulting in distortion. It should be noted that, in the lever mechanism illustrated, there are only three joints requiring welding. These are the joints of the stems and the output arm to the respective cross bars. Distortion is thus minimized and is easily accommodated by the wide range of adjustment provided by the pin and link plate couplings.

Having described my invention, I now claim:

1. A platform scale, comprising:
a housing,
a weighing platform mounted above said housing,
a suspension frame attached to said platform and extending downwardly into the housing,
lever means pivotally suspended in said housing and having an output arm for attachment to weight readout means,
said suspension frame being pivotally attached to said lever means,
certain of the pivotal attachments between said lever means and said suspension frame each including a hanger pin longitudinally secured in the lever means and having a V-notch therein,
a link plate pivotally attached to the suspension frame and having a blade portion engaged in the V-notch fixing the longitudinal position of the blade portion along the length of the hanger pin,
and means for selectively adjusting the longitudinal fixed position of the hanger pin thereby selectively moving the position of the link.

2. A platform scale according to claim 1, wherein certain of the pivotal connections of said lever means to the housing each includes a support pin longitudinally secured in the lever means and having a V-notch therein, a link plate pivotally attached to the housing and having a blade portion engaged in the V-notch fixing the longitudinal position of the blade portion along the length of the support pin, and means for selectively adjusting the longitudinal fixed position of the support pin thereby selectively moving the position of the link.

3. A platform scale according to claim 2, wherein each of said link plates has an opening to receive the respective pin, with the blade thereof extending across one end of the opening, the sides of the opening converging toward the blade.

4. A platform scale according to claim 1, wherein said lever means comprises a pair of generally T-shaped levers each having a cross bar and a stem perpendicular to the cross bar, the stems extending toward each other in substantially parallel alignment and being pivotally interconnected, the pivotal interconnection of said stems includes a connecting pin longitudinally adjustably secured in each stem, said connecting pins overlapping and having V-notches on opposite sides thereof, a link plate having blade portions engaged in the V-notches and connecting the levers, which V-notches fix the longitudinal position of the blade portions along the length of the respective connecting pin, and means for selectively adjusting the longitudinal fixed position of each of the connecting pins to thereby selectively move the position of the link plate.

5. A platform scale according to claim 4, wherein one of said levers is suspended higher than the other, and said output arm being fixed to the cross bar of the higher lever and extending over the other lever.

6. A platform scale according to claim 4, wherein said suspension frame includes hanger bars parallel to and spaced below said cross bars, said hanger pins being longitudinally slidable through the cross bars, means for fixing the longitudinal position of said hanger pins to given positions in said cross bars, and the associated link plates being pivotally attached to said hanger bars.

7. A platform scale according to claim 6, wherein said hanger bars have longitudinally extending vertical slots therein, said last mentioned link plates being held in said slots.

8. A platform scale according to claim 6, wherein said support pins are slidable through said cross bars, and the associated link plates have flexible connections to said housing.

9. A platform scale according to claim 8, wherein said support pins and hanger pins are parallel and perpendicular to the respective cross bars.

10. A platform scale according to claim 9, wherein one of said levers is suspended higher than the other; the pivotal interconnection of said stems including a connecting pin longitudinally slidable in each stem, said connecting pins overlapping in vertically spaced relation and having V-notches in opposite sides thereof, and a link plate having blade portions engaged in the V-notches.

11. A platform scale according to claim 10, and including lock screws for securing said support pins, said hanger pins and said connecting pins;

said housing having an opening below the platform through which all of said lock screws are accessible.

* * * * *